United States Patent
Warner

(10) Patent No.: US 6,470,807 B2
(45) Date of Patent: Oct. 29, 2002

(54) TURNTABLE AND DRIVE SYSTEM

(76) Inventor: Joseph H. Warner, 330 W. Champaign, Rantoul, IL (US) 61866

( * ) Notice: Subject to any disclaimer, the term of this patent is extended or adjusted under 35 U.S.C. 154(b) by 0 days.

(21) Appl. No.: 09/804,752

(22) Filed: Mar. 13, 2001

(65) Prior Publication Data

US 2002/0129730 A1 Sep. 19, 2002

(51) Int. Cl.[7] .................................. B60S 13/02
(52) U.S. Cl. ................................. 104/35; 104/38
(58) Field of Search .................... 104/35, 44, 36, 104/40

(56) References Cited

U.S. PATENT DOCUMENTS

| | | | |
|---|---|---|---|
| 4,579,188 A | 4/1986 | Facer | |
| 4,750,428 A | * 6/1988 | Hyte et al. | ............. 104/40 |
| 5,086,704 A | 2/1992 | Mueller | |
| 5,609,061 A | 3/1997 | Möller | |
| 5,626,079 A | * 5/1997 | Summers | ............. 104/44 |
| 5,755,160 A | * 5/1998 | Blufordcraving | ............. 104/36 |
| 5,852,978 A | * 12/1998 | Daschel | ............. 104/44 |

* cited by examiner

*Primary Examiner*—S. Joseph Morano
*Assistant Examiner*—Robert J. McCarry, Jr.
(74) *Attorney, Agent, or Firm*—Knechtel Demeur & Samlan

(57) ABSTRACT

A turntable and drive system for transporting parts from a first location to a second location. The turntable is mounted on a vertical shaft and has shock absorbing means located between the vertical shaft and the turntable to absorb horizontal forces on the turntable such as forklifts striking the turntable. There is a drive system that is mounted adjacent to the turntable for imparting a rotational force to the turntable. The drive system is mounted on a moveable plate that moves with the movement of the turntable so that the drive system remains in contact with the turntable at all times.

18 Claims, 3 Drawing Sheets

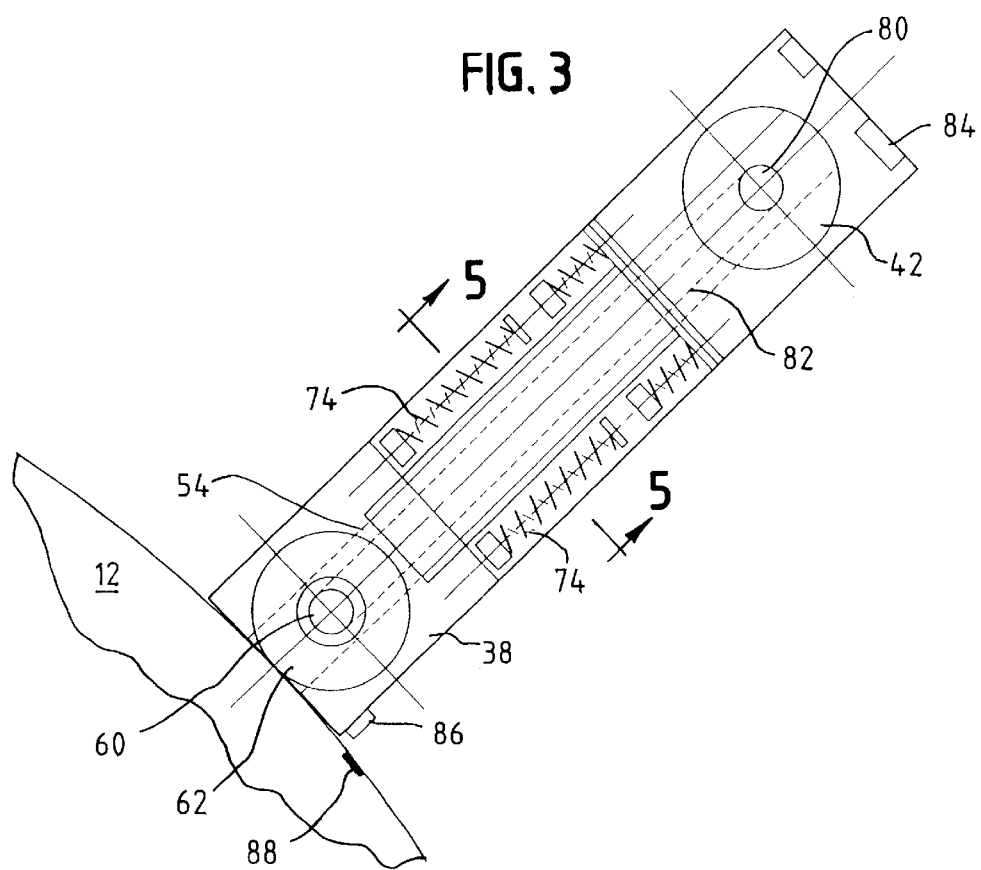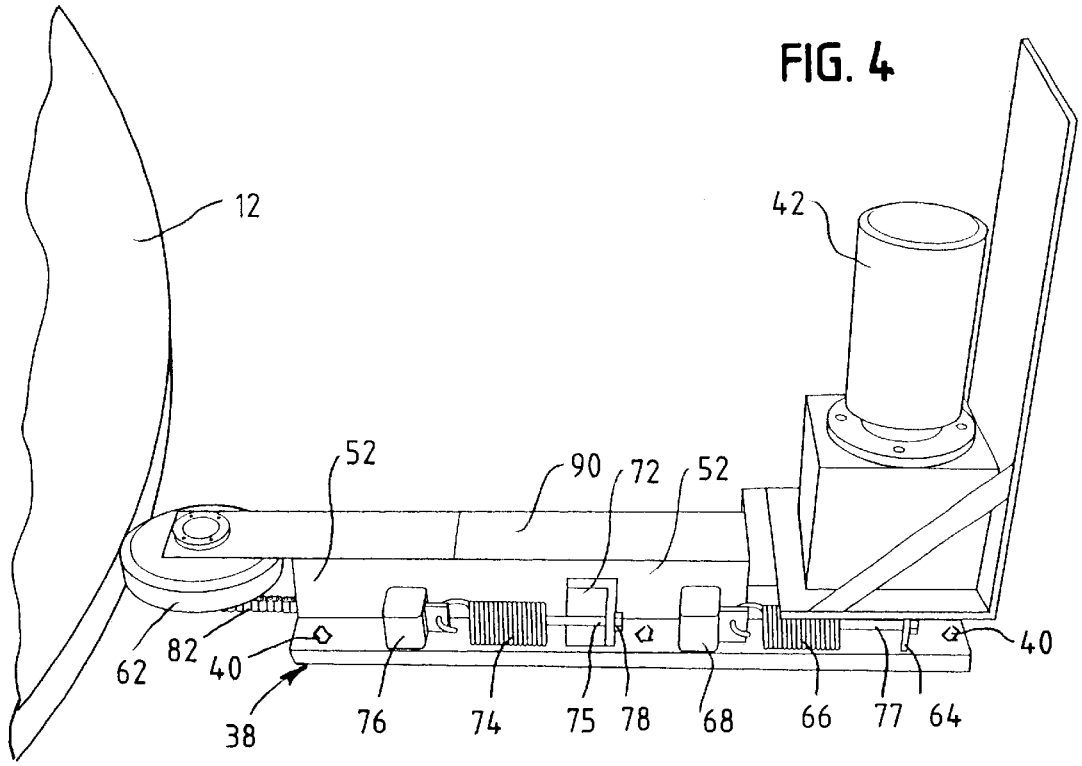

TURNTABLE AND DRIVE SYSTEM

BACKGROUND AND SUMMARY OF THE INVENTION

This invention relates to turntables used in industrial environments. In particular it is used to move large containers of parts from one location to another manufacturing location.

In manufacturing, it is necessary to move components from either the receiving docks or from storage to the first stage of the assembly or manufacturing line. Usually the components are stored on large trays, in bins or on pallets. These storage means are bulky and heavy. The bins or pallets are moved to the first stage of the assembly line, unloaded and then removed. The next full storage bin is moved into place and the process is repeated.

One shortcoming of this process is that the empty bin or pallet must be removed before the next full bin or pallet can be moved into place to be unloaded. This presents a problem in a continuous manufacturing process in that there may be downtime while waiting for the empty bin or pallet to be removed and a full one brought into place.

In the past, forklifts moved the empty bins or pallets to the first stage of the assembly line. Then the forklift removed the empty bin and the same or another forklift brings another full bin of parts. This is inefficient, costly and results in occasional accidents from forklifts hitting people, machinery or parts.

Applicant recognized the need for a means of moving large trays or bins of parts to the first stage of manufacturing or assembly, without using forklifts or related mobile equipment. Applicant also realized that it is necessary to quickly remove empty bins and replace them with full bins so that the manufacturing process flows uninterrupted.

One alternative is using conveyors to move parts. Another is to use large turntables to move the bins from one location to another. The turntables present a practical solution in that it can efficiently and economically move the large bins from one location to another.

However, there are several problems with large turntables in the manufacturing environment. First, the drive system must be fully enclosed and protected so that people do not get any of their body parts or clothing caught in the turntable or drive system. Second, forklifts, hand trucks and other parts moving equipment often strike the turntable. The turntable and its associated drive system need to be protected from damage when struck.

Applicant's invention provides a very large turntable that is controlled by a motor and drive. A full parts bin or tray is loaded onto one side of the turntable. The turntable rotates 180 degrees so that the parts bin or tray is located at the first assembly station. Another full parts bin is then loaded onto the empty half of the turntable. The first parts bin is unloaded or the individual parts are removed at the first assembly station. With an empty bin on the turntable, the turntable is again rotated 180 degrees. The second loaded bin is then at the assembly station and the empty bin is at the first location where it is removed and replaced with another full bin. The process continues uninterrupted. In an alternative embodiment, there are four parts bins on the turntable at one time so that the turntable is rotated ninety degrees each time for presenting the parts bins to three different locations.

OBJECTS AND ADVANTAGES

Thus it is an object of the present invention to provide a turntable in a manufacturing environment to move large trays, bins, pallets, or other similar storage compartments from one location to a second location.

It is a related object to provide a turntable that allows multiple storage trays to be placed on the turntable so that one storage tray can be unloaded on one side of the turntable while a second tray is loaded on another side of the turntable. Another related object is to provide a turntable that allows the presentation of the parts bins to more than two locations while the empty storage tray is removed from a first location.

Yet another object is to provide a turntable that has a substantially enclosed drive system so that people cannot easily have their body parts or clothing caught between the turntable and the turntable's drive system. A related object is to protect the drive system from people inadvertently getting themselves or other objects caught in the drive system.

Still another object is to provide a floating drive system that protects the turntable from damage when it is struck by external equipment such as forklifts. Related to this object is the object of protecting the drive system when it is struck by external equipment. It is also an object to keep the drive system driving the turntable even when a forklift strikes it.

These and other objects and advantages will be apparent upon reading the Description of the Drawings and Detailed Description of the Preferred Embodiment.

DESCRIPTION OF THE DRAWINGS

FIG. 3 is an enlarged top view of with portions removed of the drive system.

FIG. 4 is perspective view with portions removed of the drive system.

DETAILED DESCRIPTION OF THE PREFERRED EMBODIMENT

Figure 1:
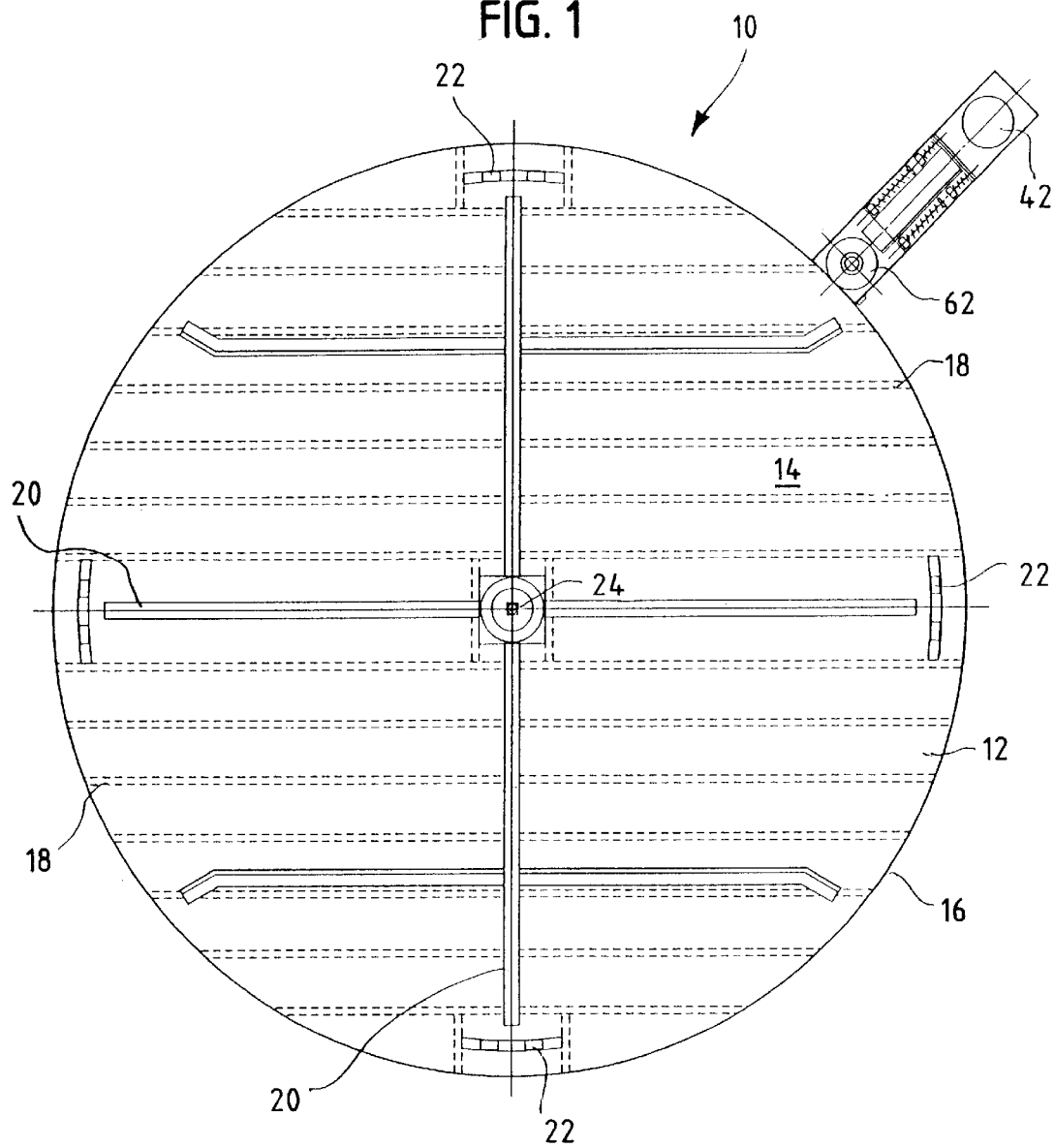
FIG. 1 is a plan view of the inventive turntable and drive system.
Figure 2:
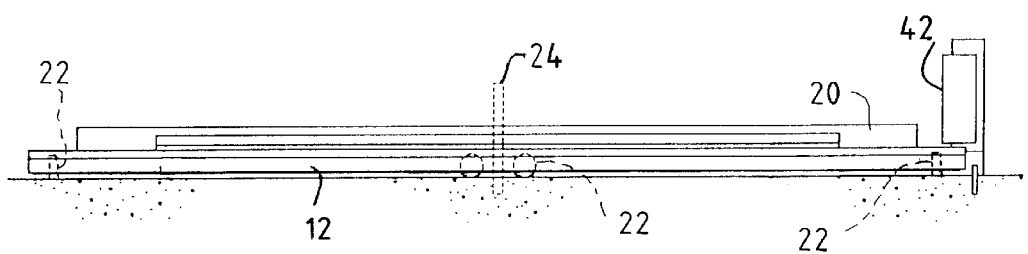
FIG. 2 is a front elevation view of the inventive turntable and drive system of FIG. 1.

Turning first to FIG. 1 there is illustrated an overall top plan view of an inventive turntable and drive system 10. There is a turntable 12 having a top surface 14 and rolled edges 16 around its circumference. The turntable 12 is made of four sections or quadrants that are joined together by underside supports 18 to form the circular configuration. The supports 18 are made from 4 inch channel iron. The turntable top surface is made from ¼ inch steel plate. The turntable 12 can be made in other configuration for ease of assembly, but in the preferred embodiment is always a circular configuration and has a diameter of approximately twenty to twenty-five feet. On the top surface are mounted four dividers 20 that divide the top surface 14 into four quadrants. The number of dividers can be varied depending on the number of pallet or bin areas desired.

For example, if parts are to be moved from a first location on one side of the turntable 12 to a second location or position 180 degrees opposite the first side, the parts are first loaded on the turntable 12 at the first location. The parts may be in a bin or on a pallet. Generally a forklift or similar device is used to move the parts onto the turntable 12. The turntable is rotated 180 degrees so that the parts are now at a second location or station, on the opposite side of the first location. The parts are removed or unloaded and used in the assembly or manufacturing process. A second bin or pallet is meanwhile loaded onto the turntable at the first location. When the parts are emptied from the first bin are emptied, the turntable is rotated another 180 degrees. This moves the empty bin to the first location to be removed and replaced by a full bin. The full bin is meanwhile moved from the first location to the second location. The process is repeated for as long as the manufacturing process continues. In an alternate configuration, there are four locations or positions around the turntable 12. Dividers 20 divide the turntable top 14 into four quadrants, one quadrant positioned at each of the four locations or positions. The turntable is rotated 90 degrees each time so that the quadrants on the turntable increment ¼ revolution at a time. Other configurations are also available depending on the particular application.

The turntable 12 is supported around its edges 16 by means of a total of sixteen polyurethane wheels 22 positioned around the circumference with four wheels positioned at ninety-degree increments. The number of wheels depends on the maximum load weight for which the turntable is designed.

Figure 6:
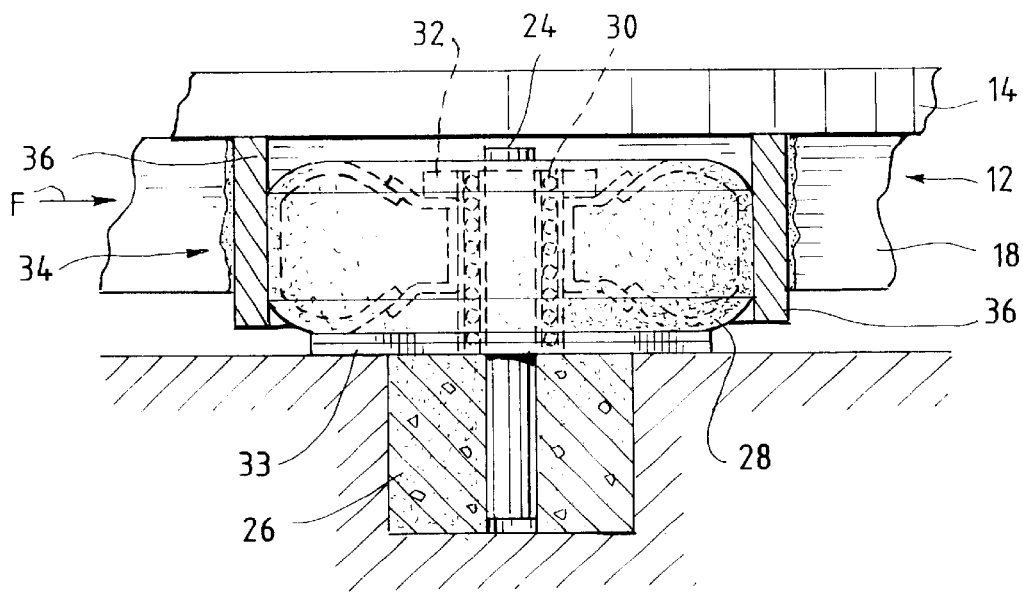
FIG. 6 is a cross section view with portions removed showing the turntable mounted for rotation.
Figure 7:
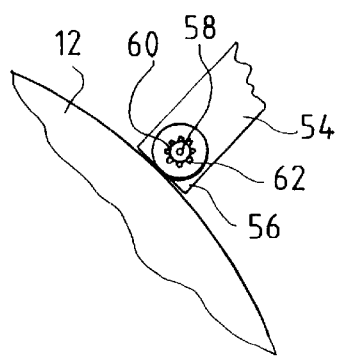
FIG. 7 is a top plan view with portions removed of the turntable drive wheel mounted on the moveable base plate.

As seen in FIG. 6, the turntable 12 is mounted on a shaft 24 that is securely embedded in concrete 26 or other suitable secure fastening means. The shaft 24 is a three inch diameter steel shaft. There is a tire 28 that is mounted to the shaft 24 by means of a bearing assembly 30. The tire 28 is a pneumatic type tire similar to an automobile tire. A steel mounting plate 32 is attached to a tire rim on which the tire is mounted. The steel plate 32 assists in securely mounting the tire 28 around the shaft 24. There is a flat flange bearing 33 between the concrete 26 and the tire 28. This allows the tire 28 to rotate with respect to the floor or concrete 26.

There is a framing channel 34 made of four inch rectangular members 36. The framing channel 34 is a square box dimensioned to firmly receive the tire 28 within it. There should not be any clearance or "play" between the insides of the framing channel 34 and the tire 28. The tops of the rectangular members are welded to the underside of the supports 18, which are in turn fastened to the top 14.

As seen in FIG. 6, if a force shown by arrow F is applied to the turntable 12, the force is transmitted through the turntable 12 to the framing channel 34. The force F can be the result of the turntable 12 being struck by a forklift or other machinery found in an industrial or manufacturing facility. The framing channel 34 pushes against the tire 28, which compresses and absorbs the force. The turntable 12 moves to the right and returns to its original position when the force F dissipates or is removed. The shaft 24 remains in its original position. Regardless of which direction the force F comes from, the framing channel 34 will push against the tire 28, which will absorb the force F. The turntable 12 moves in the direction of the force so that the force is absorbed without damage to the turntable 12 or shaft 24. The turntable 12 in effect "floats" with respect to the shaft 24. Instead of the tire 28, there may be mounted four compression springs mounted at ninety degree increments around the shaft 24. Other shock absorbing means could also be used as long as they are mounted between the shaft 24 and the framing channel 34 to absorb horizontal forces striking the turntable 12.

Figure 5:
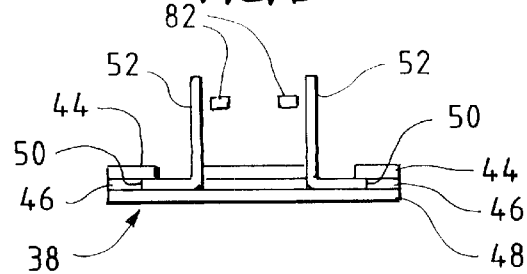
FIG. 5 is a cross sectional view taken along line 5—5 of FIG. 3.

The drive system to rotate the turntable 12 is also unique. FIGS. 3 through 5 show the details of the drive system. The drive system is mounted on a base plate 38. The base plate 38 is securely fastened to the ground by means of bolts 40 or other suitable fastening means. Mounted at one end of the base plate 38 is a gear motor 42. The gear motor 42 is electrically connected to a suitable power source.

As seen in FIG. 5, the base plate 38 is actually comprised of three plates. There is a top plate 44, a spacer plate 46 and a bottom plate 48. The top plate 44 and spacer plate 46 are mounted along the length and on both sides of the bottom plate 48. The width of the top plates 44 is greater than the width of the spacer plates 46 and the outer sides of both plates are aligned when mounted. This forms channels 50 between the top plate 44 and the bottom plate 48 on both sides of the base plate 38. The channels 50 can be formed in other ways such as cutting the channels 50 into a solid piece of metal thus forming the base plate 38 with integrally formed channels.

Captured in the channels 50 are L-plates 52. The L-plates extend substantially the entire length of the base plate 38 and located on both sides of the base plate 38. The L-plates are designed to slide horizontally in the direction of the length of the base plate 38. As seen in FIG. 5, at the bottom of the L-plates and attached between the L-plates is a moveable base plate 54. One end 56 of the L-plate is the end opposite the gear motor 42. It is adjacent to the turntable 12. Mounted to the end 56 is a vertical shaft 58. Mounted on vertical shaft 58 are a sprocket 60 and a hard rubber wheel 62. The wheel 62 is in driving frictional engagement with the rolled edge 16 of the turntable 12.

As seen in FIG. 4 there is a mounting plate 64 attached to the vertical side of L-plate 52. One end of spring 66 is attached to the mounting plate 64 and a second end is attached to a first anchor block 68. First anchor block 68 is attached to the base plate 38. There is an angular mounting plate 72 also mounted to the vertical side of L-plate 52. A second spring 74 has one end 75 mounted to the angular mounting plate 72 and a second end attached to a second anchor block 76. The second anchor block 76 is firmly attached to the base plate 38. There is another identical set of mounting plates, anchor blocks and springs on the opposite side of the base plate. Although there are two sets of springs 66 and 74, the device could be built with one spring 66 or 74 as long as it is of sufficient strength.

When an external force such as a forklift strikes the turntable 12, the turntable moves horizontally with respect to the shaft 24. The turntable 12 and edges 16 move a distance proportional to the striking force of the object hitting the turntable 12. If the turntable is struck with a force in a direction away from the hard rubber wheel 62, the hard rubber wheel will lose driving engagement with the turntable 12 if the wheel 62 is mounted on a stationary fixed shaft. If the striking force is in the direction of the wheel 62 and the wheel did not move, it will either be damaged, its shaft 58 will be bent, or the turntable will be damaged. In order to solve these problems, the inventive device allows the wheel 62 to move with respect to the movement of the turntable 12. In order to maintain the hard rubber wheel 62 in driving engagement with the turntable 12, the base plate 54 is mounted for radial movement with respect to the turntable 12. At all times the moveable base plate 54 has a force applied to it in the direction toward the turntable 12 in order to maintain the wheel in driving engagement with the turntable 12.

This driving engagement force is created by the first and second springs 66 and 74. When the drive system is initially installed, the L-plate 52 and moveable base plate 54 are pushed toward the turntable 12 until the hard rubber wheel 62 is in engagement with the turntable 12. The first and second springs 66 and 74 are tightened by a nut 78 attached to the spring ends 75 and 77. This places the first and second springs 66 and 74 in tension. As the other end of the springs 66 and 74 are attached to the first and second anchor blocks 68 and 76 respectively, that are in turn attached to the base plate 38, the first and second springs 66 and 74 pull the L-plate 52 toward the turntable 12. This maintains the hard rubber wheel 62 against the turntable 12. If the turntable 12 moves as the result of being struck by a forklift or other external force, the hard rubber wheel 62 moves with the movement of the turntable 12. This is because the wheel 62 is mounted on the moveable base plate 54. Regardless of which radial direction the turntable 12 moves, the hard rubber wheel 62 remains in driving engagement with the turntable 12.

The power train is most clearly illustrated in FIG. 3. The gear motor 42 is attached to the base plate 38. The gear motor is a 1.5 hp 1140 rpm gear motor with a 40 to 1 gear reduction. Mounted on the output shaft is a gear 80. A chain 82 has one end wrapped around the gear 80. The other end of the chain 82 is wrapped around the sprocket 60. The chain 82 passes between the L-shaped plates 52 above the base plate 54. A cover plate 90 encloses the top of the L-shaped plates 52 so that the chain 82 is completely enclosed. The cover plate 90 may be made in sections to provide access to the chain 82. Additional covers enclose the rubber wheel 62 so that only the peripheral edge contacting the turntable 12 is exposed. This minimizes the possibility of a person placing his or her hand between the turntable and the wheel 62, or getting any loose article of clothing stuck in the any part of the drive system.

A controller 84 controls the operation of the gear motor 42. A stop sensor 86 is mounted on the base plate 38 adjacent to the turntable 12. The turntable 12 has plastic sensor pieces 88 embedded in the edge 16. These are positioned wherever the turntable is to be stopped. Thus if the turntable is to rotate 180 degrees each time, there are two sensor pieces 88 located 180 degrees apart. If the turntable is to rotate 90 degrees each time, there are four sensor pieces 88 positioned at each 90 degrees around the edge 16. When the stop sensor 86 senses the plastic insert 88, a stop signal is sent to the controller 84 that in turn stops the gear motor 42 which stops the turntable 12. When the controller 84 receives a start signal, the gear motor starts until another stop signal is received. The controller 84 and gear motor 42 may also have associated with it an inverter (not illustrated) to provide a gradual and smooth starting of the gear motor 42.

Applicant's invention provides a system in which the turntable has a shock absorbing mechanism located at the center of the turntable. The drive system is mounted remote from the center of the turntable. The drive system is no longer under the turntable as in prior devices but is mounted adjacent to the turntable. It is easily accessible for service or adjustment. If there is a problem, the downtime is greatly reduced, as the turntable does not have to be lifted for access to the drive system. The drive system moves with respect to the turntable when a forklift or similar equipment strikes the turntable. This minimizes damage to the drive system when the turntable is struck. It also keeps the drive wheel in contact with the turntable at all times, even when the turntable moves as the result of being struck.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A turntable mounted above a ground surface and drive system for rotating the turntable comprising:

a vertical turntable shaft;

a circular turntable having an outer perimeter and a centrally disposed bore, the bore receiving the vertical turntable shaft for mounting the circular turntable on the shaft and above the ground surface;

force absorbing means disposed between the vertical turntable shaft and the circular turntable for absorbing horizontally disposed forces that contact the circular turntable;

drive means for rotating the vertical turntable, the drive means mounted adjacent to the outer perimeter for imparting a rotational force to the circular turntable;

the drive means mounted above the ground surface on a drive mounting means for allowing the drive means to move horizontally in response to the horizontal movement of the circular turntable when the horizontally disposed force contacts the circular turntable so that the drive means maintains engagement with the outer perimeter.

2. The turntable and drive system of claim 1 wherein the force absorbing means comprises a circular rubber-like member mounted on the vertical turntable shaft.

3. The turntable and drive system of claim 2 and further comprising frame members mounted to the circular turntable, the frame members enclosing the circular rubber-like member whereby the circular rubber-like member is disposed between the frame members and the vertical turntable shaft.

4. The turntable and drive system of claim 1 wherein the drive means comprises a circular drive wheel with a driving perimeter, the driving perimeter frictionally engaging the outer perimeter for imparting the rotational force to the circular turntable.

5. The turntable and drive system of claim 4 wherein the circular drive wheel is mounted on a horizontally moveable base plate, and further comprising spring means engaging the base plate for applying a force to the base plate for keeping the circular drive wheel in contact with the outer perimeter.

6. The turntable and drive system of claim 4 and further comprising a motor operatively connected to the circular drive wheel to impart a rotational force to the circular drive wheel.

7. The turntable and drive system of claim 1 and further comprising control means for rotating the circular turntable a predetermined amount and stopping the rotation at predetermined points.

8. The turntable and drive system of claim 6 wherein the control means comprises a sensor mounted adjacent to the circular turntable, and location indicating means on the turntable detectable by the sensor, the sensor sending a signal responsive to detecting the location indicating means for controlling the motor.

9. The turntable and drive system of claim 1 wherein the vertical turntable shaft is securely embedded in the ground and a bearing is mounted between the vertical turntable shaft and the centrally disposed bore.

10. A turntable mounted above a ground surface and drive system for rotating the turntable for moving items from a first location to a second location comprising:

a vertical shaft mounted in a stationary base;

a circular turntable having an outer perimeter and a centrally disposed bore, the bore receiving the vertical shaft for mounting the circular turntable on the shaft;

horizontal force absorbing means mounted between the vertical turntable shaft and the circular turntable for absorbing horizontally disposed forces that contact the circular turntable;

a drive wheel mounted above the ground surface on a horizontally moveable base plate adjacent to the outer perimeter, the drive wheel engaging the outer perimeter for imparting a rotational force to the circular turntable;

spring means engaging the moveable base plate for applying a force to the base plate for keeping the drive wheel in contact with the outer perimeter when the horizontal force contacts the circular turntable causing the turntable to move horizontally.

11. The turntable and drive system of claim 10 wherein the horizontally moveable base plate is adapted for movement toward and away from the turntable while maintaining the drive wheel in engagement with the outer perimeter.

12. The turntable and drive system of claim 10 wherein the horizontal force absorbing means comprises a circular rubber-like member mounted on the vertical turntable shaft.

13. The turntable and drive system of claim 12 and further comprising frame members mounted to the circular turntable, the frame members enclosing the circular rubber-like member whereby the circular rubber-like member is disposed between the frame members and the vertical turntable shaft.

14. The turntable and drive system of claim 10 and further comprising a motor operatively connected to the drive wheel to impart a rotational force to the drive wheel.

15. The turntable and drive system of claim 10 and further comprising control means for rotating the circular turntable from the first location to the second location and stopping the turntable when the turntable reaches the second location.

16. The turntable and drive system of claim 15 wherein the control means comprises a sensor mounted adjacent to the circular turntable, and location indicating means on the turntable detectable by the sensor, the sensor sending a signal responsive to detecting the location indicating means for controlling the motor.

17. The turntable and drive system of claim 16 wherein a first location indicating means is mounted on the outer perimeter corresponding to the first location, and a second location indicating means is mounted on the outer perimeter corresponding to the second location.

18. The turntable and drive system of claim 10 wherein the vertical turntable shaft is securely embedded in the stationary base and a bearing is mounted between the vertical turntable shaft and the centrally disposed bore.

* * * * *